(12) United States Patent
Olson

(10) Patent No.: US 7,899,245 B2
(45) Date of Patent: Mar. 1, 2011

(54) MORPHOLOGICAL BASED SEGMENTER

(75) Inventor: Teresa Olson, Winter Garden, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 950 days.

(21) Appl. No.: 10/330,088

(22) Filed: Dec. 30, 2002

(65) Prior Publication Data

US 2004/0126013 A1 Jul. 1, 2004

(51) Int. Cl.
*G06K 9/34* (2006.01)
(52) U.S. Cl. .................................................. 382/173
(58) Field of Classification Search .................. 382/173
See application file for complete search history.

(56) References Cited

U.S. PATENT DOCUMENTS

| | | | |
|---|---|---|---|
| 5,181,255 A | 1/1993 | Bloomberg | |
| 5,202,933 A | 4/1993 | Bloomberg | |
| 5,293,430 A | 3/1994 | Shiau et al. | |
| 5,341,439 A | 8/1994 | Hsu | |
| 5,604,822 A | 2/1997 | Pearson et al. | |
| 5,640,468 A | 6/1997 | Hsu | |
| 5,825,922 A | 10/1998 | Pearson et al. | |
| 5,960,111 A | 9/1999 | Chen et al. | |
| 6,031,935 A | 2/2000 | Kimmel | |
| 6,047,090 A | 4/2000 | Makram-Ebeid | |
| 6,061,471 A | 5/2000 | Coleman, Jr. | |
| 6,075,875 A | 6/2000 | Gu | |
| 6,415,062 B1 * | 7/2002 | Moed et al. | 382/260 |
| 6,453,069 B1 * | 9/2002 | Matsugu et al. | 382/173 |
| 6,631,212 B1 * | 10/2003 | Luo et al. | 382/228 |
| 6,731,799 B1 * | 5/2004 | Sun et al. | 382/173 |
| 6,757,414 B1 * | 6/2004 | Turek et al. | 382/128 |
| 6,771,834 B1 * | 8/2004 | Martins et al. | 382/257 |
| 6,819,796 B2 * | 11/2004 | Hong et al. | 382/173 |
| 6,993,158 B2 * | 1/2006 | Cho et al. | 382/103 |
| 2002/0071034 A1 * | 6/2002 | Ito et al. | 348/152 |

OTHER PUBLICATIONS

Masahisa Kaneta, Kimiharu Kanemaru, Hitoshi Kanoh, and Toshio Nagai, "Image Processing Method for Intruder Detection around Power Line Towers", IEEE. Trans. Inf. & Syst., vol. E76-D, No. 10, Oct. 1993, pp. 1153-1161.*
Haritaoglu et at ("W4: Real-Time Surveilllance of People and Their Activities", IEEE Trans. Pattern Analysis and Machine Intelligence, vol. 22, No. 8, Aug. 2000, pp. 809-830).*

* cited by examiner

*Primary Examiner*—Yuzhen Ge
(74) *Attorney, Agent, or Firm*—Buchanan Ingersoll & Rooney PC

(57) ABSTRACT

A method for segmenting an object within an image including extracting an edge image containing a first set of pixels from the image, generating a second set of pixels from the first set of pixels using mathematical morphology, and identifying a segment corresponding to the object.

30 Claims, 4 Drawing Sheets

MORPHOLOGICAL BASED SEGMENTER

BACKGROUND

1. Field of Invention

The present invention relates generally to the field of imaging. More particularly, the invention relates to segmenting an object from an image or sequence of images.

2. Background Information

Image-based tracking systems are designed to track an object by the signature of the object within an image that is received by an imaging system. The signature can be from either a grayscale imaging system, such as an IR imaging system, or a color imaging system. Based upon the location, size and shape of the signature in an image or in a sequence of images, a tracking system can determine position, range and other features of the object. For example, imaging systems used in missile-based tracking systems can identify features of an object based upon the object's signature within an image to classify a signature as a target signature, as well as, determine guidance information for guiding a missile.

The process used in imaging systems to extract or separate out a representation of the object from its signature within an image is called segmenting. Pixels of the signature, which actually illustrate features (i.e., edges) of the object, are used in generating a segment that is representative of the object. After a segment or set of pixels representing the object in the image is defined, a variety of features, both statistical and deterministic in nature, can be evaluated in order to determine information about the object from the segment. For example, the signature of an object is initially indicated within an image by any number of detection schemes. Then a subarea of the image containing the indicated signature is processed to define a set of pixels (i.e., segment) representing the object. Subsequently, the features of the segment can be compared to features of known target types to identify whether the object is a target. In addition, tracking information can be determined by the pixel location and size of the segment from the image, or from a sequence of images.

Image processing segmentation can be inaccurate in depicting or representing the features of an object due to clutter, variations or inconsistencies in the signature of the object. Thus, subsequent evaluations for tracking (i.e. distance, position and/or speed of the object) or identification of the object can be erroneous.

Lighting effects (i.e. shadows), atmospheric conditions (i.e., heat waves radiating from the ground), background imagery, foreground imagery and the resolution limits of the imaging system can cause inconsistencies in the signature or, particularly as the object moves, variations in the signature in a sequence of images. If the imaging system of a tracking system is in motion while tracking the object, changes in the aspect angle, depression angle and distance of the target object to the imaging system can vary the signature of an object in a sequence of images and also cause inconsistencies in the signature. In addition, background imagery, foreground imagery and atmospheric conditions can cause clutter in and around a signature.

SUMMARY

It is desirable for a segmenter to accommodate for inconsistences within a signature for an object within an image. It is also desirable for a segmenter to accommodate for variations of a signature within a sequence of images. Further, it is desirable for a segmenter to define a set of pixels representative of an object from a cluttered signature of the object within an image.

In accordance with exemplary embodiments of the invention, a method for segmenting an object within an image includes extracting an edge image containing a first set of pixels from the image, generating a second set of pixels from the first set of pixels using mathematical morphology and identifying a segment corresponding to the object.

Also in accordance with exemplary embodiments of the invention, a method for segmenting an object within an image includes extracting an edge image containing a first set of pixels representing edges within the image, filling in pixels between the edges to generate a second set of pixels and determining a third set of pixels representing the object from the second set of pixels based upon a predetermined centroid shape. This also includes rejection of extraneous clutter near the image

BRIEF DESCRIPTION OF THE DRAWING FIGURES

Objects and advantages of the invention will become apparent from the following detailed description of preferred embodiments in connection with the accompanying drawings, in which like numerals designate like elements.

DETAILED DESCRIPTION OF THE PREFERRED EMBODIMENTS

Figure 1:
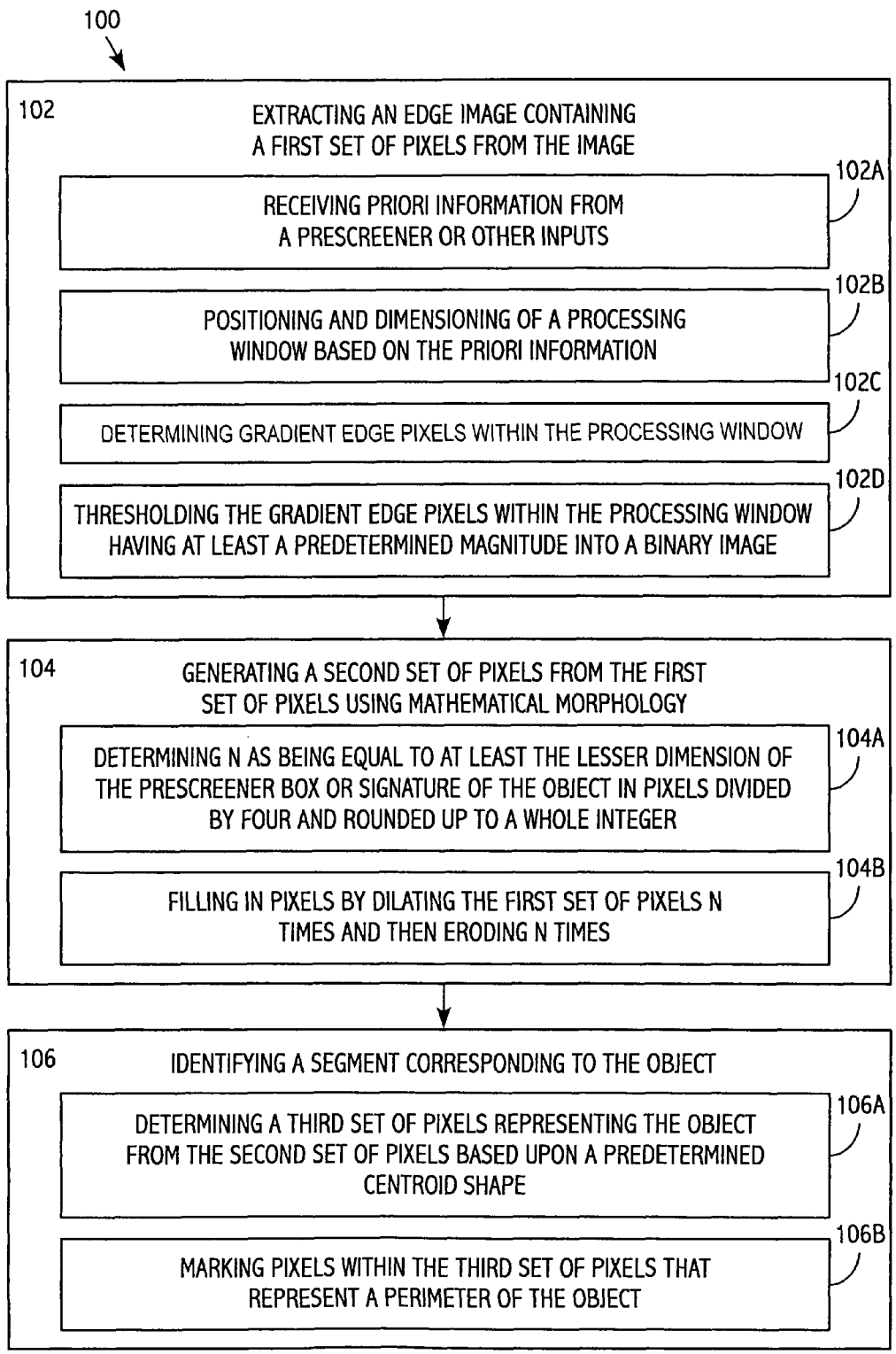
FIG. 1 is a block diagram of an exemplary embodiment of a method for segmenting an object within an image.

FIG. 1 is an exemplary embodiment of a method 100 for segmenting an object from a signature of the object within an image. The method 100 includes extracting a gradient edge image from the image containing a first set of pixels 102a. The first set of pixels is, for example, a Sobel edge image that represents edges within the image. The edges represented in the first set of pixels can be the strong edges in the image that are indicative of exterior outline edges of the object as opposed to interior contour edges of an object. For example, a known Sobel edge operator is applied to provide gradient magnitudes and edge directions. Pixels of the image are then thresholded to binarized values in that a pixel having at least a predetermined gradient magnitude is assigned a one, and each pixel that is below the predetermined gradient magnitude is assigned a zero. Environmental conditions that the tracking system is expected to be used in, performance requirements, types of targets expected, and the like are factors in establishing the predetermined gradient magnitude.

To reduce the processing load on the tracking system, the gradient edge image can be extracted only from a subarea of the entire image. The subarea is a processing window within the image that is centered about a centroid for the object. The dimensions and position of the processing window are based on receiving priori information regarding bounds on the size of a target box and location of the centroid for the object from an input by an operator or autonomously from a detector or pre-screener tracking the object.

For example, a helicopter pilot in a helicopter carrying the missile can look at an IR image, and designate a target signature within the image by placing a target box around the target. Thus, the pilot is inputting priori knowledge of the general dimensions of the object and the location of a centroid for the object (i.e., the center of the target box). However, as time passes, the tracking system and/or the target object can move with respect to each other, which can cause the target signature to move to a different location in the image and have different dimensions within the image. The tracking system detects and tracks these changes and corrects for the dimensions of the object and position of the centroid for the object with the pre-screener. A centroid for an object is either a pixel or predetermined centroid shape positioned at the center of a possible target signature. The shape of the centroid can be indicative of the type of target (e.g., tank, aircraft, truck, building). The pre-screener is a target detector that indicates possible target signatures by providing a list of centroid positions of all possible targets in each image frame, as well as, the size of pre-screener boxes centered about each centroid to encompass a possible target.

As shown in the exemplary embodiment 100 of FIG. 1, extracting an edge image containing a first set of pixels from the image 102 can include receiving priori information from a pre-screener or other inputs 102a. Subsequently, the positioning and dimension of a processing window is based on the priori information 102b. The position of the processing window is, for example, centered about a centroid for the object as indicated by the pre-screener. The dimensions of the processing window is, for example, about two times greater than dimensions of the pre-screener box for the object. In the alternative, the dimensions of the processing window can be about two times greater than the dimensions of a signature for the object within the image as indicated by other inputs. The processing window should be large enough to encompass the object's signature in the image, as well as, additional space for subsequent morphological processing. However, the size of the object's signature will change as the distance between the tracking system and the object changes.

For example, a target's signature in the tracking system of a homing missile will become larger as the missile gets closer to the target. In accordance with an exemplary embodiment of the invention, the size of the processing window is adjusted so that the object's signature does not outgrow the reference window, as well as, provide additional space for subsequent morphological processing. The increase in additional space is proportional to the increase in the size of the object with the processing window having at least a lesser dimension that is half of a lesser dimension of the object's signature or size within the image. If the greater dimension of the processing window exceeds the limits of the image frame, the greater dimension can be reduced so that it will fit within the image frame.

As referred to in the exemplary embodiment 100 of FIG. 1 as 102c, gradient edge pixels are determined within the processing window 102c subsequent to the dimensioning and positioning of a processing window. Then, as referred to in the exemplary embodiment 100 of FIG. 1 as 102d, the edge pixels within the processing window having at least a predetermined magnitude are thresholded into a first set of pixels as a binary image. The predetermined magnitude can be the same threshold value as the threshold value used by the pre-screener to detect possible targets. For example, if the edge image is an image called Sobel and the threshold value used by the pre-screener is SobelThresh, then a binary image called Edge can be computed with the following formula.

Edge=Sobel>SobelThresh

Figure 2:
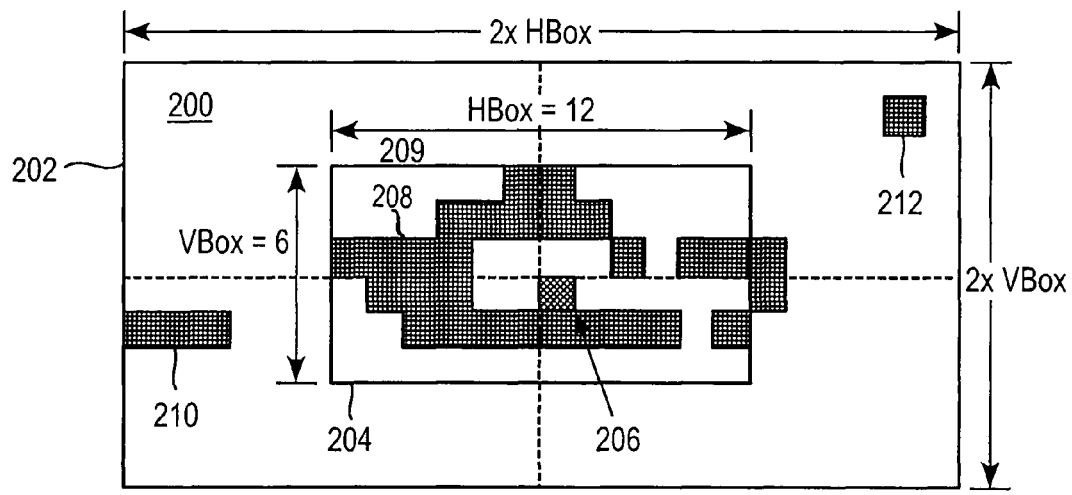
FIG. 2 is an exemplary edge image.

Typically, the Edge image will have a set of pixels that only somewhat show the perimeter of the object along with both interior and exterior clutter pixels. FIG. 2 is an example of an edge image 200 within a processing window 202 and a pre-screener box 204 with a pre-screener centroid 206 at (CRow, CCol). The example of FIG. 2 includes an incomplete outline of the object with interior clutter 209 and exterior clutter 210 and 212. The pre-screener box 204 indicative of the object 208 has a greater dimension of HBox =12 and a lesser dimension of VBox=6. To provide for subsequent processing space and maintain acquisition of the object 208, the dimensions of the processing window 202 are, for example, about two times greater than dimensions of the pre-screener box 204 for the object 208, as shown in FIG. 2.

The missing pixels along the perimeter of the object, as well as, pixels within the perimeter of the object are added to fill in the representation of the object for subsequent evaluations. Thus, a second set of pixels is generated from the first set of pixels using mathematical morphology, as referred to in 104 of the exemplary embodiment 100 in FIG. 1. The filling in of additional pixels can be achieved by applying a dilate operation for several iterations and then applying an erode operation for an equal number of iterations.

As referred to in 104a of the exemplary embodiment of FIG. 1, the number of iterations at least equal to the lesser dimension of the pre-screener box or signature of the object in pixels divided by four and rounded up to a whole integer. For example, the number of iterations for the Edge image 200 in FIG. 2 can be computed from the lesser dimension VBox of the pre-screener box 204 as follows:

NFILL=round(VBox/4)=round(6/4)=2

Subsequently, as referred to in 104b of the exemplary embodiment of FIG. 1, pixels are filled in by dilating the first set of pixels of the Edge image 200 an N number (i.e., NFill) of times and then eroding N (i.e., NFill) number of times. The number of iterations should only be sufficient to fill the object to suppress the effects of exterior clutter on the object's perimeter outline during mathematical morphology. In the alternative, the number of iterations N can at least be equal to a lesser dimension of the object in pixels based on prior information regarding size of the object divided by four and then rounded up to a whole integer, regardless of whether a processing window or pre-screener is used.

Figure 3:
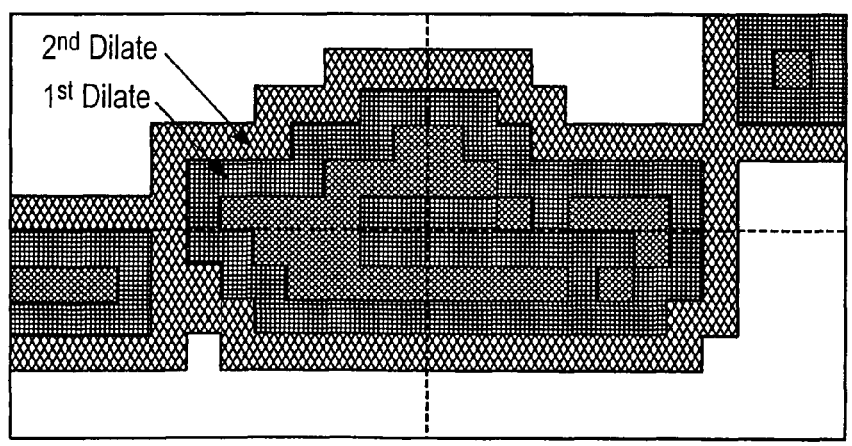
FIG. 3 is an exemplary dilated image.

The binary dilate operation includes setting each pixel to 1 that has one of its 8 neighbors that is set to 1. The progression of this process is shown in FIG. 3. The black region is the original binary Edge image 200, the medium gray is the image after the first dilate, and the light gray is the image after the second dilate. The pixels in white are considered to be 0.

Figure 4:
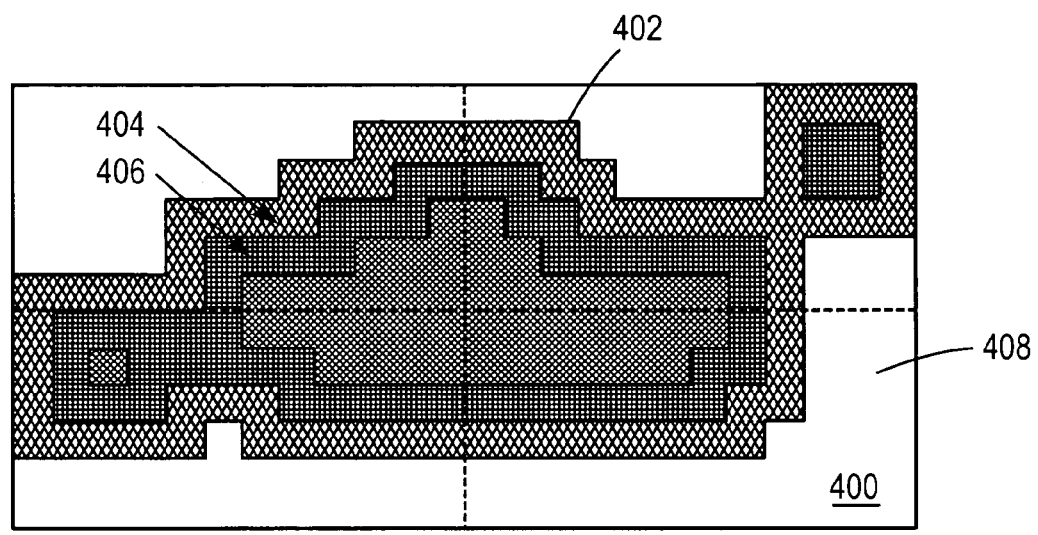
FIG. 4 is an exemplary eroded image.

The erode operation includes setting each pixel to 0 that has one of its 8 neighbors and itself are set to 0. This process is shown in the image 400 of FIG. 4. The light gray region 402 is the dilated image of the object and the external clutter, the medium gray 404 is the image of the object and the external clutter after the first erode, and the black region 406 is the image of the object and the external clutter after the second erode. The pixels 408 around the edge of the light gray region are always set to 0, since pixels outside of the dilated image are always considered to be 0 (i.e., background pixels).

Figure 5:
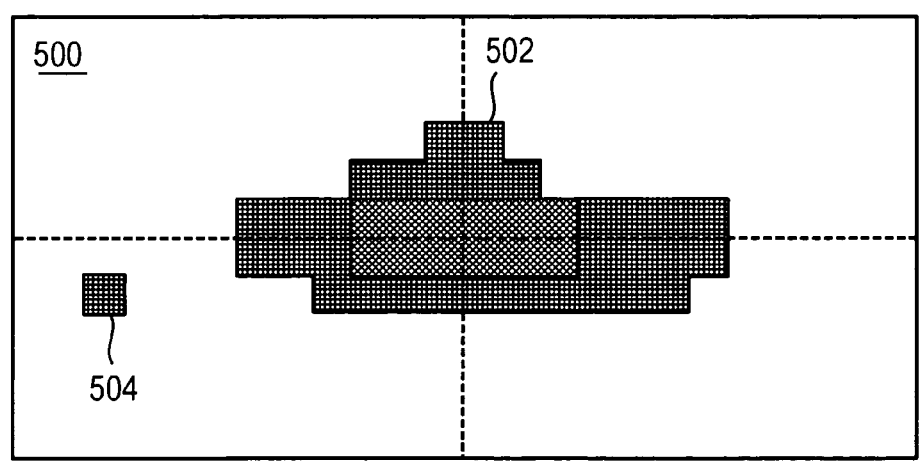
FIG. 5 is an exemplary filled image and a predetermined centroid shape.

Then, as referred to in the exemplary embodiment 100 of FIG. 1 as 106, a segment is identified corresponding to the object. As shown in the FIG. 5, the image 500 of a second set of pixels now consists of the filled object pixels 502 and possibly some clutter pixels 504. As referred to in 106a of the exemplary embodiment of FIG. 1, a third set of pixels (i.e., object pixels 502) are determined from the second set of pixels based upon a predetermined centroid shape. The third set of pixels or segment is isolated from the external clutter, if any, in that the external clutter is eliminated.

To isolate the third set of pixels or segment representing the object, pixels forming a predetermined centroid shape are centered at the centroid of the object within the second set of pixels and marked. The centroid of the object is based on the priori information as discussed above. In an exemplary embodiment, the predetermined centroid shape can be a closed contour of any shape that fits within the box bounds, and which is no more than half the size (half rounded down to the nearest even number) of the pre-screener box or the object's signature.

The predetermined shape can be one or more pixels marked with a value indicating that they are interior pixels of the segment. The second set of pixels together with the marked predetermined centroid shape are checked for pixels set to 1 that have an 8-neighbor that is marked with a value indicating that the pixel is an interior pixel. This is repeated until all pixels set to one can be marked. Pixels that are not marked are reset to 0.

For example, the following computations can be performed to identify a segment corresponding to the object with "FilledImg" being the second set of pixels and "Marked" being the predetermined centroid shape.

Marked=Marked and FilledImg
Marked=dilate (Marked)
Marked=Marked and FilledImg

Repeat steps 2 and 3 until Marked does not change, (i.e., a maximum of max(Vbox,Hbox)/2 iterations).

FilledImg=Marked

Figure 6:
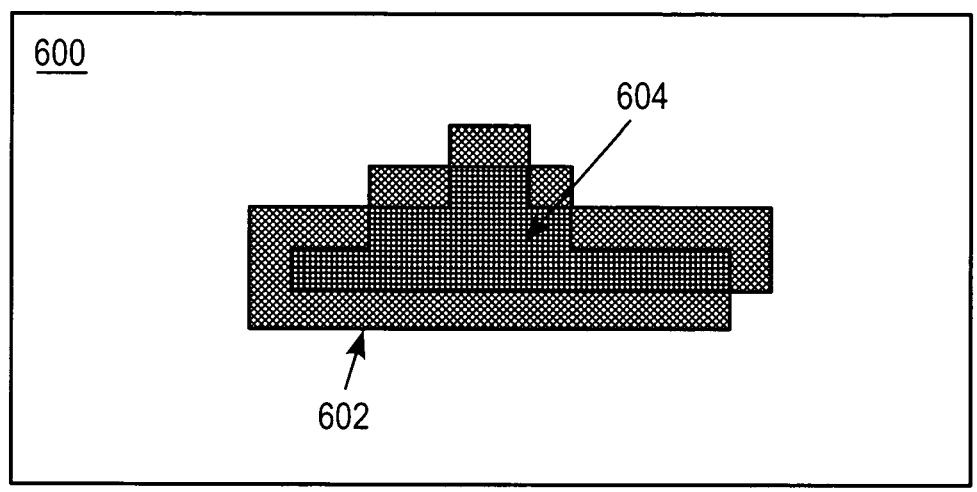
FIG. 6 is an exemplary image of a segment.

After the object has been segmented, the segment of the object can be further identified by as referred to in the exemplary embodiment 100 of FIG. 1 as 106*b*, pixels within the third set of pixels are marked that represent a perimeter of object. A perimeter pixel is defined as a target pixel that does not have all of its 4-neighbors set. This will produce a tri-level image, SegMask, with pixels set to a value that specify that they are background pixels 600, pixels set to a first value specifying that they are perimeter pixels 602 and pixels set to a second value specifying that they interior pixels 604, as shown in FIG. 6. If SegMask consists of only background pixels, the segment is considered to be invalid. SegMask is the final output of the segmenter, along with SegImg, which is the intensity image associated with SegMask.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method for segmenting an object within an image in a tracking device, comprising:
    placing a processing window within the image that is centered about a centroid of the object, wherein the processing window comprises a subarea of the image, and dimensions and position of the processing window are based on priori information regarding size of a pre-screener box for the object and location of a centroid of the object based on input from an operator;
    extracting, in the tracking device, from the subarea of the image within the processing window, an edge image containing a first set of pixels from the object;
    generating, in the tracking device, a second set of pixels from the first set of pixels using mathematical morphology to fill in pixels of the edge image;
    identifying, in the tracking device, a segment corresponding to the object from the second set of pixels; and
    autonomously tracking the object with a pre-screener in the tracking device and adjusting the size of the processing window to prevent a signature of the object from outgrowing the processing window to permit subsequent morphological processing of the object, wherein a size of the signature changes in accordance with a distance between the pre-screener and the object.

2. The method for segmenting an object within an image according to claim 1, wherein the first set of pixels have at least a predetermined gradient magnitude.

3. The method for segmenting an object within an image according to claim 1, wherein dimensions and position of the processing window are based on priori information regarding size of the pre-screener box for the object and location of the centroid for the object from the pre-screener in the subsequent morphological processing of the object.

4. The method for segmenting an object within an image according to claim 1, wherein dimensions of the processing window are at least two times greater than dimensions of the signature for the object within the image.

5. The method for segmenting an object within an image according to claim 1, wherein dimensions of the processing window are at least two times greater than dimensions of the pre-screener box.

6. The method for segmenting an object within an image according to claim 1, wherein the mathematical morphology dilates the first set of pixels N times and then erodes N times to generate the second set of pixels.

7. The method for segmenting an object within an image according to claim 5, wherein the mathematical morphology dilates the first set of pixels N number of times and then erodes N number of times to generate the second set of pixels and N is equal to a lesser dimension of the pre-screener box in pixels divided by four and then rounded up to a whole integer.

8. The method for segmenting an object within an image according to claim 6, wherein N is equal to a lesser dimension of the object in pixels based on priori information regarding size of the object divided by four and then rounded up to a whole integer.

9. The method for segmenting an object within an image according to claim 1, wherein identifying a segment includes determining a third set of pixels representing the object from the second set of pixels.

10. The method for segmenting an object within an image according to claim 5, wherein identifying a segment includes determining a third set of pixels representing the object from the second set of pixels.

11. The method for segmenting an object within an image according to claim 9, wherein the third set of pixels are determined based on a predetermined centroid shape.

12. The method for segmenting an object within an image according to claim 10, wherein the third set of pixels are determined based on a predetermined centroid shape and dimensions of the centroid shape are no more than half of the dimensions of the pre-screener box.

13. The method for segmenting an object within an image according to claim 9, wherein identifying a segment includes marking pixels within the third set of pixels that represent a perimeter of the object within the image.

14. The method for segmenting an object within an image according to claim 12, wherein identifying a segment includes marking pixels within the third set of pixels that represent a perimeter of the object.

15. The method for segmenting an object within an image according to claim 11, wherein the predetermined centroid shape is from the pre-screener.

16. The method for segmenting an object within an image according to claim 1, wherein extracting an edge image from the subarea of the image within the window containing a first set of pixels from the object includes extracting a gradient edge image by applying an edge detection operator to the subarea of the image within the window.

17. The method for segmenting an object within an image according to claim 16, wherein the edge detection operator comprises a Sobel edge operator.

18. A method for segmenting an object within an image in a tracking device, comprising:
  placing a processing window within the image that is centered about a centroid of the object, wherein the processing window comprises a subarea of the image, and dimensions and position of the processing window are based on priori information regarding size of a pre-screener box for the object and location of a centroid of the object based on input from a pre-screener in the tracking device autonomously tracking the object;
  extracting, in the tracking device, from the subarea of the image within the processing window, an edge image containing a first set of pixels from the object;
  generating, in the tracking device, a second set of pixels from the first set of pixels using mathematical morphology to fill in pixels of the edge image;
  identifying, in the tracking device, a segment corresponding to the object from the second set of pixels; and
  adjusting, in the tracking device, the size of the processing window to prevent a signature of the object from outgrowing the processing window to permit subsequent morphological processing of the object, wherein size of the signature changes in accordance with a distance between the pre-screener and the object.

19. The method for segmenting an object within an image according to claim 18, wherein the first set of pixels have at least a predetermined gradient magnitude.

20. The method for segmenting an object within an image according to claim 18, wherein dimensions of the processing window are at least two times greater than dimensions of the signature for the object within the image.

21. The method for segmenting an object within an image according to claim 18, wherein dimensions of the processing window are at least two times greater than dimensions of the pre-screener box.

22. The method for segmenting an object within an image according to claim 18, wherein the mathematical morphology dilates the first set of pixels N times and then erodes N times to generate the second set of pixels.

23. The method for segmenting an object within an image according to claim 21, wherein the mathematical morphology dilates the first set of pixels N number of times and then erodes N number of times to generate the second set of pixels and N is equal to a lesser dimension of the pre-screener box in pixels divided by four and then rounded up to a whole integer.

24. The method for segmenting an object within an image according to claim 22, wherein N is equal to a lesser dimension of the object in pixels based on priori information regarding size of the object divided by four and then rounded up to a whole integer.

25. The method for segmenting an object within an image according to claim 18, wherein identifying a segment includes determining a third set of pixels representing the object from the second set of pixels based on a predetermined centroid shape from the pre-screener.

26. The method for segmenting an object within an image according to claim 21, wherein identifying a segment includes determining a third set of pixels representing the object from the second set of pixels based on a predetermined centroid shape and wherein dimensions of the predetermined centroid shape are no more than half of the dimensions of the pre-screener box.

27. The method for segmenting an object within an image according to claim 18, wherein identifying a segment includes determining a third set of pixels representing the object from the second set of pixels and marking pixels within the third set of pixels that represent a perimeter of the object within the image.

28. The method for segmenting an object within an image according to claim 21, wherein identifying a segment includes determining a third set of pixels representing the object from the second set of pixels and marking pixels within the third set of pixels that represent a perimeter of the object.

29. The method for segmenting an object within an image according to claim 18, wherein extracting an edge image from the subarea of the image within the window containing a first set of pixels from the object includes extracting a gradient edge image by applying an edge detection operator to the subarea of the image within the window.

30. The method for segmenting an object within an image according to claim 29, wherein the edge detection operator comprises a Sobel edge operator.

* * * * *